United States Patent
Loheide et al.

(10) Patent No.: US 10,264,294 B2
(45) Date of Patent: Apr. 16, 2019

(54) VALIDATING AND CALIBRATING SPLICE POINTS IN INTERSTITIAL CONTENT

(71) Applicant: Turner Broadcasting System, Inc., Altanta, GA (US)

(72) Inventors: Donald Jude Loheide, Mobleton, GA (US); Kevin Scott Snedden, Decatur, GA (US); Steven Ernest Riedl, Atlanta, GA (US); James T Bernier, Jr., Milton, GA (US)

(73) Assignee: Turner Broadcasting System, Inc., Atlanta, GA (US)

( * ) Notice: Subject to any disclaimer, the term of this patent is extended or adjusted under 35 U.S.C. 154(b) by 9 days.

(21) Appl. No.: 15/395,461

(22) Filed: Dec. 30, 2016

(65) Prior Publication Data

US 2018/0192093 A1  Jul. 5, 2018

(51) Int. Cl.
| | |
|---|---|
| *H04N 21/234* | (2011.01) |
| *H04N 21/235* | (2011.01) |
| *H04N 21/81* | (2011.01) |
| *H04N 21/262* | (2011.01) |
| *H04N 21/8547* | (2011.01) |

(52) U.S. Cl.
CPC ... *H04N 21/23424* (2013.01); *H04N 21/2353* (2013.01); *H04N 21/26283* (2013.01); *H04N 21/812* (2013.01); *H04N 21/8547* (2013.01)

(58) Field of Classification Search
CPC ......... H04N 21/23424; H04N 21/2353; H04N 21/26283; H04N 21/812; H04N 21/8547
See application file for complete search history.

(56) References Cited

U.S. PATENT DOCUMENTS

| | | | | |
|---|---|---|---|---|
| 6,137,539 | A * | 10/2000 | Lownes | H04N 5/44513 348/569 |
| 6,483,547 | B1 * | 11/2002 | Eyer | H04N 5/46 348/473 |
| 6,993,789 | B1 * | 1/2006 | Sezan | H04N 21/235 375/E7.024 |

(Continued)

OTHER PUBLICATIONS

International Organsation for Standardization, ISO/IEC13818-1: Information technology—Generic coding of moving pictures and associated audio information: System Amendment 1: carriage of metadata over ISO/IEC 13818-1 streams, Aug. 1, 2003, entire document (Year: 2003).*

*Primary Examiner* — Hunter B Lonsberry
(74) *Attorney, Agent, or Firm* — Chip Law Group

(57) ABSTRACT

A television playout system that handles playout of a channel, receives a video feed of the channel comprising programming data and a plurality of interstitial content items, and a playout schedule of the channel. Metadata comprising a pre-roll value is inserted at a first insertion point related to a first interstitial content item of the plurality of interstitial content items, based on the playout schedule. An offset is detected in the metadata, based on the first insertion point of the metadata in the video feed, the pre-roll value, and a time-code (TC) jump associated with a second interstitial content item in the video feed. One or more control parameters associated with the insertion of the metadata are calibrated, based on the detected offset to align a splice point related to the first interstitial content item with the TC jump associated with the second interstitial content item.

27 Claims, 9 Drawing Sheets

(56) References Cited

U.S. PATENT DOCUMENTS

| | | | |
|---|---|---|---|
| 8,321,887 B2* | 11/2012 | DuBose | H04N 7/165 725/144 |
| 2002/0083440 A1* | 6/2002 | Dupuis | G06F 17/30787 725/32 |
| 2010/0031285 A1* | 2/2010 | Haberman | H04H 20/103 725/34 |
| 2014/0282723 A1* | 9/2014 | Sinha | H04H 60/40 725/35 |
| 2015/0172731 A1* | 6/2015 | Hasek | H04N 21/2541 725/28 |
| 2016/0057317 A1* | 2/2016 | Zhao | H04N 21/4627 348/515 |
| 2016/0182979 A1* | 6/2016 | McCoy | H04N 21/85406 725/32 |
| 2018/0220169 A1* | 8/2018 | Yang | H04N 21/235 |

* cited by examiner

VALIDATING AND CALIBRATING SPLICE POINTS IN INTERSTITIAL CONTENT

CROSS-REFERENCE TO RELATED APPLICATIONS/INCORPORATION BY REFERENCE

Not Applicable.

FIELD OF TECHNOLOGY

Certain embodiments of the disclosure relate to management of television programming and advertisements in broadcast systems. More specifically, certain embodiments of the disclosure relate to a method and system for validating and calibrating splice points in interstitial content in a program stream of a channel.

BACKGROUND

Most broadcasting and cable networks in the United States are advertisement-based. Typically, in a program stream of a channel, such as in television (TV) programming, interstitial content items, such as advertisements, promotional media, and/or the like, are inserted in between main program segments, such as in a TV program. A network provider (network operator) usually enters into a deal with advertisers in which the network provider is liable to display interstitial content items for a specific duration of time for delivery of impressions to the advertisers. The network provider develops a playout schedule of a channel to display the interstitial content items and the main program content.

Traditionally, the network provider has to visually monitor the playout of the channel so as to ensure that the interstitial content items appear in accordance with the playout schedule. Usually, the interstitial content items are inserted in a commercial break based on the playout schedule, such that a transition of one interstitial content item to another interstitial content item is in accordance with the playout schedule. The transition points of the interstitial content items may be referred to as splice points. The insertion of the interstitial content items in the commercial break is prone to many challenges, such as a splicing error. For example, due to a splicing error a viewer may see an interstitial content item played for an extended duration erroneously. This splicing error may further result in other errors, for example, missing introductory dialog and closed captions of next interstitial content item (or advertisement), cut-off dialog and closed caption signaling, or display of captions on screen for an interstitial content item when such captions are not supposed to be displayed for that particular interstitial content item. Traditionally, this challenge was addressed by reserving a period of black video near intended splice points (i.e., the transition points) so that the error was not noticeable. However, such practice reduced media inventory and devalued viewer experience as well. Other approaches include visual inspection, insertion of metadata, such as society of cable telecommunication engineers (SCTE)-104-based digital ad-markers, and/or the like, to trigger the transition (or splicing) between inserted interstitial content items. These approaches, though they may improve media inventory to some extent, are still susceptible to splicing errors, such as an erroneous insertion of the metadata which may cause an early (or delayed) transition between the interstitial content items. Such errors may not be visually noticeable at an early stage of a channel broadcast. However, a repetitive error may lead to visually noticeable artifacts. Once detected, this is may be a highly laborious process that would take several days, even weeks, to compensate for the error and involves a fair amount of manual rework.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for validation and calibration of splice points in interstitial content, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
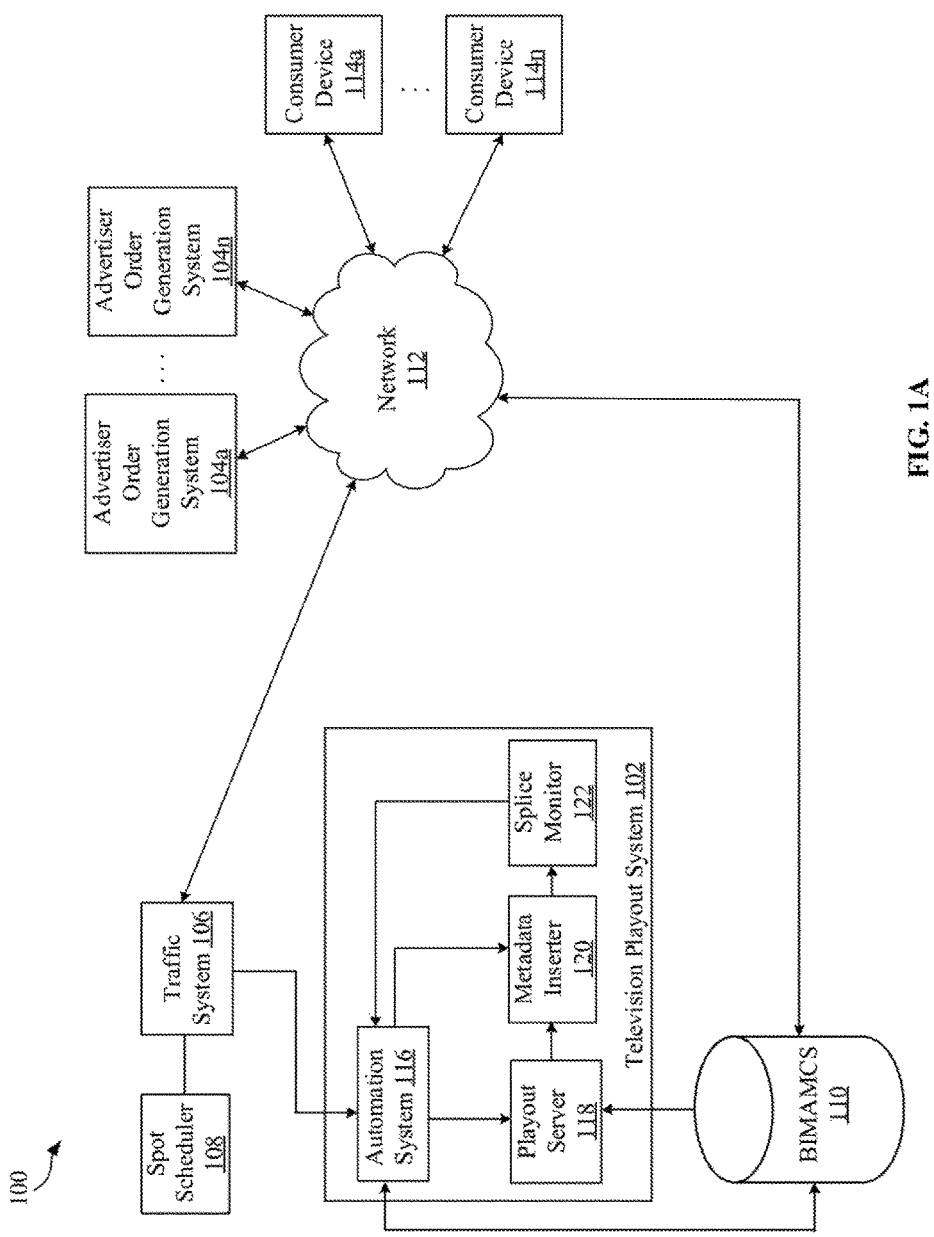
FIG. 1A is a block diagram that illustrates an exemplary system for validating and calibrating splice points in interstitial content, in accordance with an exemplary embodiment of the disclosure.

Certain embodiments of the disclosure may be found in a method and system for validating and calibrating splice points in interstitial content. Various embodiments of the disclosure provide a method and system that simplifies the splice point adjustment of the interstitial content. Various embodiments of the disclosure provide an automated technique for detection of any error in splice points of a video feed of a channel, such as a program stream. In accordance with various embodiments of the disclosure, a television playout system that handles playout of a channel, receives a video feed of the channel comprising programming data and a plurality of interstitial content items, and a playout schedule of the channel. Metadata comprising a pre-roll value is inserted at a first insertion point related to a first interstitial content item of the plurality of interstitial content items. The metadata is inserted based on the received playout schedule to indicate a splice point related to the first interstitial content item. An offset is detected in the inserted metadata based on the first insertion point of the metadata in the video feed, the pre-roll value, and a time-code (TC) jump associated with a second interstitial content item in the video feed. One or more control parameters associated with the insertion of the metadata are calibrated, based on the detected offset to align the splice point related to the first interstitial content item in the video feed with the TC jump associated with the second interstitial content item in the video feed.

In accordance with an embodiment, the received video feed may correspond to an uncompressed serial digital interface (SDI) video. The received video feed may further include ancillary data comprising close caption data, format definition data, and vertical interval time codes (VITC). The plurality of interstitial content items may correspond to an advertisement and/or a promotional media. The one or more control parameters may correspond to the first insertion point of the metadata, the pre-roll value, and/or the playout schedule. A time instant of the video feed that is related to the first insertion point may correspond to a command time of the inserted metadata. The splice point related to the first interstitial content item may correspond to a transition from the first interstitial content item to the second interstitial content item. The second interstitial content item may follow the first interstitial content item in the received video feed.

The detected offset may correspond to a difference between the first insertion point of the metadata and an intended insertion point of the metadata related to the first interstitial content item of the plurality of interstitial content items in the video feed. The detected offset may further correspond to a time gap or a frame gap between the splice point related to the first interstitial content item and the TC jump associated with the second interstitial content item. The TC jump associated with the second interstitial content item may correspond to a jump in VITC associated with the first interstitial content item and the second interstitial content item. In accordance with an embodiment, the inserted metadata may correspond to a Society of Cable Telecommunications Engineers (SCTE)-104-based digital ad-marker. The television playout system may communicate the video feed with the aligned splice point to one or more encoders for distribution.

Traditionally, downstream insertion and replacement of media (such as programming content and/or interstitial content) in a video feed of a linear channel is inaccurate. Thus, a viewer viewing the channel may see portions of an original media (such as programming content and/or interstitial content) that should have been replaced. Previously, to make the splicing error unnoticeable and provide a more seamless viewing experience, a period of black video was inserted near intended splice points in the video feed. However, the addition of the period of black video reduced the available inventory, which in turn resulted in loss of ad revenue and adversely affected the customer viewing experience.

In order to overcome the disadvantages related to the addition of the period of black video, industry standard data packets (also referred as metadata) are inserted into vertical ancillary (VANC) data of the video feed in accordance with society of motion picture and television engineers (SMPTE) 2010 standards. The metadata enables the authorized receiving devices to replace the media content with new content. However, any error in the insertion of these industry standard data packets may further lead to an early or a delayed replacement of the original content item with a new content item. This error (also referred to as splicing error) may disrupt the whole or entire playout schedule. In case of real-time or dynamic insertion of media content, such as a live video, the error in the insertion of the metadata may cause clipping of the media content. Generally, such errors are inspected manually (such as a visual inspection) for a certain time period to check if the splice point is properly positioned so as to insert new material accurately. However, visual inspection may be highly inaccurate and time consuming method. Further, the splicing error in the video feed may not be detected during early stages by visual inspection. Thus, an additional burden is put on the network provider for the validation of splicing in the video feed of the channels.

FIG. 1A is a block diagram that illustrates an exemplary system for validating and calibrating splice points in interstitial content, in accordance with an exemplary embodiment of the disclosure. Referring to FIG. 1A, the system 100, comprises a television playout system 102 that is communicatively coupled to a plurality of advertiser order generation systems 104a, . . . , 104n, a traffic system 106, and a broadcast inventory management and media content storage (BIMAMCS) 110, via a network 112. There is also shown a plurality of consumer devices 114a, . . . , 114n that are communicatively coupled to the network 112. The television playout system 102 may comprise an automation system 116, a playout server 118, a metadata inserter 120, and a splice monitor 122. The traffic system 106 may be communicatively coupled to a spot scheduler 108.

The television playout system 102 may comprise suitable logic, circuitry, and interfaces that may be configured to execute code that handles a playout of a channel (such as a TV content channel). In this regards, the television playout system 102 may adjust splice points of a plurality of interstitial content items in a video feed of the channel to maintain a desired playout schedule. The television playout system 102 may be operated by a broadcasting company, which may be referred to as a broadcast provider or operator, or a network provider or operator. The broadcast provider may handle a single channel or a plurality of channels, or one or more networks. The broadcast provider may be configured to multicast programming data and interstitial content via one or more channels, for example, traditional over-the-air broadcast channels, cable television networks, satellite communication networks, the Internet, and/or other content delivery networks (CDNs).

The plurality of advertiser order generation systems 104a, . . . , 104n may comprise suitable logic, circuitry, and interfaces that may be configured to place orders with the broadcasting company that include information about type of interstitial content items to be broadcasted, a count of interstitial content items to be broadcasted, and a date and time of airing the interstitial content items. The plurality of advertiser order generation systems 104a, . . . , 104n may provide multiple orders, which need not be submitted at the same time. Therefore, the traffic system 106 may continuously receive orders with new or additional interstitial content items to be placed and may need to update any previously determined playout schedule to accommodate the constraints and requirements of the interstitial content items already placed and of the new interstitial content items being received. In this regard, the plurality of advertiser order generation systems 104a, . . . , 104n may electronically book interstitial content items to a selling title (ST), and within the selling title there are constraints. The ST may refer to a program in which an inventory bucket airs. One commercial break, for example a 30 seconds commercial airtime, usually includes multiple inventory buckets, and each inventory bucket may represent an inventory unit. In this regard, the inventory bucket typically inherits the ST in which it is scheduled. In other words, the ST is an interval of programming time that a network provider utilizes to sell commercial airtime, and it may comprise a particular show (Dallas, Cougar Town, etc.) or a block or time (Daytime—8:00 AM to 3:00 PM, Overnight-12:00 midnight to 6:00 AM, etc.). In some cases, the term daypart may be utilized as an alternative name for a ST, but in other cases a daypart may be an aggregation of STs. The advertiser's order comprises airing constraints and placement requirements corresponding to the plurality of interstitial content items, and each of the one or more commercial breaks comprises a plurality of inventory buckets. The airing constraints corresponding to each of the plurality of interstitial content items comprise, for example, one or more of network constraints, selling title constraints, inventory utilization type constraints, allowable date and time constraints, and advertiser conflict constraints. The placement requirements corresponding to each of the plurality of interstitial content items comprise, for example, one or more of associative constraints, position constraints, time separation constraints, franchise and/or title exclusion constraints, and spot pinning constraints. The associative constraints define the positioning of any two or more interstitial content items relative to each other within the same one of the at least one of the plurality of inventory buckets or in adjacent inventory buckets. The position constraints define the positioning of any one interstitial content item in one of the at least one of the plurality of inventory buckets and/or in a commercial break.

The traffic system 106 may comprise suitable logic, circuitry, and interfaces that may be configured to execute code that receives cleared and/or modified orders and queue them for spot schedule solving to determine placement of the plurality of interstitial content items in the inventory buckets. In this regard, the cleared and/or modified orders may comprise orders that have been created or generated based on estimated inventory reserves. The traffic system 106 may be configured to receive advertisers orders from the plurality of advertiser order generation systems 104a, . . . , 104n, and place the plurality of interstitial content items into one or more commercial breaks (also referred to as advertisement space) appearing in a same ST or different STs.

The spot scheduler 108 may comprise suitable logic, circuitry, and interfaces that may be configured to execute code to place the plurality of interstitial content items into inventory buckets of the commercial breaks based on the solved placement of the plurality of interstitial content items. The spot scheduler 108 may be further configured to generate the playout schedule based on the placement of the plurality of interstitial content items into the inventory buckets of the commercial breaks.

The BIMAMCS 110 may comprise suitable logic, circuitry, and interfaces that may be configured to execute code to clear advertiser orders, for example, on a first come first serve (FCFS) basis. Media content related to programming data, such as main program content, TV shows, or programs, and the plurality of interstitial content items may be ingested in the BIMAMCS 110. In accordance with an embodiment, the BIMAMCS 110 may include media in compressed, file format such as MPEG2 that may be streamed as uncompressed SDI by an MPEG decoding device during playout. The BIMAMCS 110 may be configured to transmit the programming data and the plurality of interstitial content items to the television playout system 102 based on the playout schedule.

The network 112 may be any kind of network, or a combination of various networks, and it is shown illustrating the communication that may occur between the television playout system 102, the plurality of advertiser order generation systems 104a, . . . , 104n, the traffic system 106, the BIMAMCS 110, and the plurality of consumer devices 114a, . . . , 114n. For example, the network 112 may comprise one or more of a cable television network, the Internet, a satellite communication network, a wide area network (WAN), a medium area network (MAN), and a local area network (LAN).

The plurality of consumer devices 114a, . . . , 114n may refer to end-user devices where the programming data and the plurality of interstitial content items are played to be viewed by a viewer. The number of impressions of an interstitial content item in the plurality of interstitial content items, such as an advertisement and/or promotional media, on such plurality of consumer devices 114a, . . . , 114n determines the advertising impact or promotion impact and number of actual audiences achieved for a certain defined time period. Examples of the plurality of consumer devices 114a, . . . , 114n may include, but are not limited to connected TVs, connected TV with paired devices (e.g., tablets), and second screen devices such as smartphones and tablets, for example.

The automation system 116 is provided in the television playout system 102. The automation system 116 may comprise suitable logic, circuitry, and interfaces that may be configured to execute code for coordination among various components of the television playout system 102, such as the playout server 118 and the metadata inserter 120. The automation system 116 may instruct the playout server 118 and the metadata inserter 120 for insertion of metadata in a video feed that comprises programming data and the plurality of interstitial content items in the form of a linear stream. The video feed may correspond to the uncompressed SDI video. The automation system 116 may be further configured to adjust an insertion point of the metadata in the video feed based on an offset in a previously inserted metadata as detected by the splice monitor 122.

The playout server 118 may comprise suitable logic, circuitry, and interfaces that may be configured to execute code that handles the video feed comprising programming data and the plurality of interstitial content items based on the playout schedule. In this regards, the playout server 118 may receive the programming data and the plurality of interstitial content items from the BIMAMCS 110. The playout server 118 may further place the plurality of interstitial content items in the video feed in the allotted inventory buckets based on the playout schedule. Thus, the video feed may include a linear stream of the plurality of interstitial content items and the programming data in accordance with the playout schedule. The playout server 118 may further synchronize audio data and video data of the plurality of interstitial content items and the programming data.

The playout server 118 may be further operable to embed ancillary data in the video feed. Exemplary ancillary data may include close caption data, format definition data, VITC, and/or the like.

The metadata inserter 120 is provided in the television playout system 102. The metadata inserter 120 may comprise suitable logic, circuitry, and interfaces that may be configured to execute code that handles the insertion of metadata, such as society of cable telecommunication engineers (SCTE)-104-based digital ad-marker, in the video feed. In this regard, the metadata inserter 120 may be configured to insert the metadata as per society of motion picture and television engineers (SMPTE) 2010 standards provided by the automation system 116. The metadata may include a pre-roll value, which indicates splice points related to the plurality of interstitial content items in the video feed. For example, the metadata inserter 120 may insert metadata comprising a pre-roll value (such as 1000 milliseconds (ms)) at a first insertion point related to a first interstitial content item of the plurality of interstitial content items. The pre-roll of "1000 ms" may indicate that the splice point related to the first interstitial content item is after "1000 ms" from the first insertion point of the metadata in the video feed. The first insertion point of the metadata may be referred to as command frame.

The splice monitor 122 is provided in the television playout system 102. The splice monitor 122 may comprise suitable logic, circuitry, and interfaces that may be configured to execute code to detect an offset in the inserted metadata in the video feed. The offset in the inserted metadata may indicate an error in the insertion point of the metadata. The splice monitor 122 may detect the offset in the metadata inserted in the first interstitial content item, based on an insertion point (such as the first insertion point) of the metadata in the video feed, the pre-roll value, and a time-code (TC) jump associated with a second interstitial content item in the video feed. The TC jump corresponds to a jump or variation in the VITC embedded in the video feed. The VITC may represent the ancillary data embedded as pairs of black and white bars in the video feed. The VITC associated with different interstitial content items may be different. Thus, a sudden jump or variation (i.e., the TC jump) in the VITC embedded in the video feed may indicate a likelihood of transition between interstitial content items. This property may be leveraged for the offset detection. The splice monitor 122 may be further configured to generate an alarm and/or a log report based on the detection of the offset in the inserted metadata. The log report may include details, such as a time gap (i.e., an offset time duration), a frame gap (i.e., a count of offset frames), and/or the like, of the detected offset. The splice monitor 122 may provide information of the detected error, such as the log report, to the automation system 116.

In operation, the television playout system 102 may be configured to handle a playout of a channel (such as a television channel). The television playout system 102 may receive a video feed of the channel that comprises programming data and a plurality of interstitial content items, and a playout schedule of the channel. The plurality of interstitial content items may correspond to advertisements and/or promotional media (also referred to as promos). The playout schedule of the channel from the traffic system 106 may be received by the automation system 116. The automation system 116 may further query the BIMAMCS 110 to provide the programming data and the plurality of interstitial content items based on the playout schedule. The playout server 118 may receive the programming data and the plurality of interstitial content items that are included in the video feed. The metadata inserter 120 may insert metadata comprising the pre-roll value, at the first insertion point related to the first interstitial content item of the plurality of interstitial content items, based on the received playout schedule. The inserted metadata may indicate the splice point related to the first interstitial content item. An example of the metadata inserted in the video feed is shown and described in FIG. 2. The splice monitor 122 may detect the offset in the inserted metadata, based on the first insertion point of the metadata in the video feed, the pre-roll value, and a time-code (TC) jump associated with a second interstitial content item in the video feed. The splice monitor 122 may further provide details pertaining to the detected offset to the automation system 116. The automation system 116 may further calibrate one or more control parameters associated with the insertion of the metadata, based on the detected offset to align the splice point related to the first interstitial content item in the video feed with the TC jump associated with the second interstitial content item in the video feed. The one or more control parameters may correspond to the first insertion point of the metadata, the pre-roll value, and/or the playout schedule. Examples of the offset detection in the inserted metadata and calibration of the one or more control parameters are shown and described in FIGS. 4A and 4B.

Figure 1B:
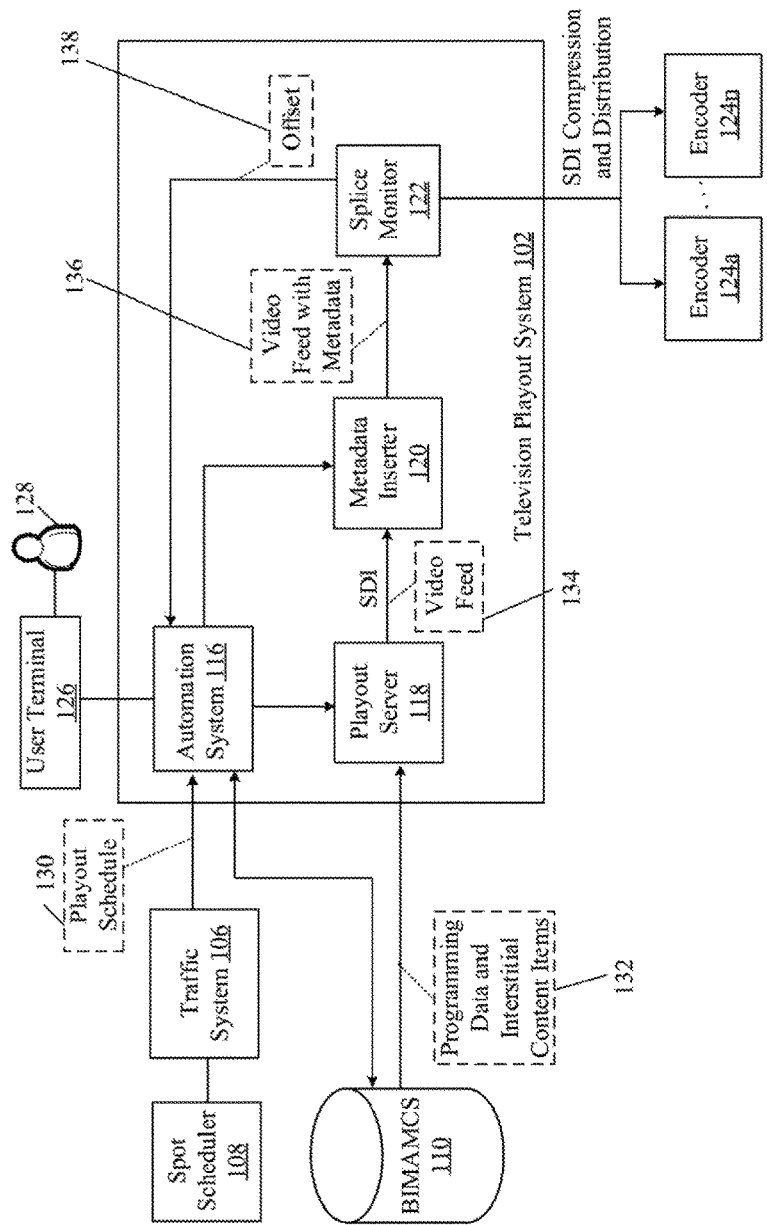
FIG. 1B is a block diagram that illustrates an exemplary television playout system for validating and calibrating splice points in interstitial content, in accordance with an exemplary embodiment of the disclosure.

FIG. 1B is a block diagram that illustrates an exemplary television playout system for validating and calibrating splice points in interstitial content, in accordance with an exemplary embodiment of the disclosure. Referring to FIG. 1B, the television playout system 102 may further comprise one or more user terminals, such as a user terminal 126 associated with a monitoring user 128. The television playout system 102 may also be communicatively coupled to one or more encoders 124a, ..., 124n. There is also shown a playout schedule 130, programming data and a plurality of interstitial content items 132, a video feed 134, a video feed with metadata 136, and an offset 138. There is also shown the automation system 116, the playout server 118, the metadata inserter 120, and the splice monitor 122 included in the television playout system 102, as described in FIG. 1A. There is further shown the traffic system 106, the spot scheduler 108, and the BIMAMCS 110, as described in FIG. 1A.

In some embodiments of the disclosure, the automation system 116, the playout server 118, the metadata inserter 120, and the splice monitor 122 may be integrated to form an integrated system. In some embodiments of the disclosure, as shown, the automation system 116 may be distinct from the playout server 118, the metadata inserter 120, and the splice monitor 122. In some embodiments of the disclosure, the spot scheduler 108 may be integrated as part of the traffic system 106 to form an integrated system. In some embodiments of the disclosure, the spot scheduler 108 may be located separately from the traffic system 106. The functions and/or operations performed by the television playout system 102, and its various components, are further described, in FIGS. 2, 3, 4A, 4B, 5A, 5B, and 6. Other separation and/or combination of the various entities of the exemplary television playout system illustrated in FIG. 1B may be done without departing from the spirit and scope of the various embodiments of the disclosure.

The user terminal 126 may comprise a keypad, display, speaker, microphone, pointing device to enable a user, such as the monitoring user 128 to interact with the television playout system 102. The user terminal 126 may be configured to present a user interface that enables the monitoring user 128, such as a content scheduler to configure and interact with components such as the automation system 116.

The one or more encoders 124a, . . . , 124n may comprise suitable logic, circuitry, and interfaces that may be configured to execute code that may be configured to encode the video feed that has aligned splice points for distribution. The one or more encoders 124a, . . . , 124n may encode the video feed by varying bitrates. In this regard, the more encoders 124a, . . . , 124n may encode the video feed utilizing a plurality of different bit bitrates. The one or more encoders 124a, . . . , 124n may further convert the SCTE-104-based digital ad-marker to SCTE-35-based digital ad-marker during encoding. The one or more encoders 124a, . . . , 124n further condition the encoded video feed to ensure correct splicing in the video feed. The encoded video feed may be multiplexed and communicated (or stored), via the network 112 for the playout, and finally delivered (multicast) to be viewed on the plurality of consumer devices 114a to 114n.

The playout schedule 130 may correspond to a schedule pertaining to a playout of the programming data and the plurality of interstitial content items 132. The playout schedule 130 may include an ordering of the programming data and the plurality of interstitial content items 132. During the playout, the programming data and the plurality of interstitial content items 132 are played out in the corresponding ordering included in the playout schedule 130. The spot scheduler 108 may be configured to generate the playout schedule 130.

The programming data and the plurality of interstitial content items 132 may correspond to the content received form broadcast inventory management, such as the BIMAMCS 110, based on the playout schedule 130. The programming data may include one or more program segments of main program content separated by one or more commercial breaks. The plurality of interstitial content items may correspond to advertisements and/or promotional media that are to be inserted in the plurality of inventory buckets in the one or more commercial breaks.

The video feed 134 may correspond to a linear program stream of a channel that includes the programming data and the plurality of interstitial content items 132 ordered based on the playout schedule 130. The video feed 134 may correspond to an uncompressed SDI video. The video feed 134 may be further embedded with the ancillary data, such as the close caption data, format definition data, VITC, and/or the like.

The video feed with metadata 136 may correspond to the uncompressed SDI video that includes inserted metadata, such as SCTE-104-based digital ad-markers. The metadata inserted in the video feed may indicate the splice points related to the plurality of interstitial content items in the video feed. The SCTE-104-based digital ad-marker may be inserted in an SDI video as vertical ancillary (VANC) data. The SCTE-104 may comprise a 10-bit hexadecimal format so as to match data in the uncompressed SDI video (such as the video feed 134). The metadata may be inserted at an intended insertion point or an erroneous insertion point in the video feed 134 during the insertion process. The intended insertion point of the metadata related to a first interstitial content may correspond to a point in the video feed 134 at which the metadata is desired to be inserted, so that the splice point related to the first interstitial content item is aligned with the TC jump associated with a second interstitial content item that follows the first interstitial content item in the video feed 134. The erroneous insertion point of the metadata is any insertion point other than the intended insertion point. The actual insertion point of the metadata in the video feed 134 may be referred to as the first insertion point. The first insertion point (i.e., the actual insertion point) of the metadata may either correspond to the intended insertion point or the erroneous insertion point.

The offset 138 may indicate an erroneous insertion of the metadata in the video feed 134. The offset 138 may correspond to a difference between the first insertion point (i.e. the actual insertion point) of the metadata and the intended insertion point of the metadata related to an interstitial content item of the plurality of interstitial content items in the video feed. The offset 138 may further correspond to the time gap or the frame gap between an intended splice point related to the first interstitial content item and an erroneous splice point related to the first interstitial content item. The intended splice point may be identified based on the TC jump associated with a second interstitial content item that follows the first interstitial content item. The offset 138 may be "zero" when the first insertion point is same as that of the intended insertion point. Examples of the offset are shown and described in FIGS. 4A and 4B.

Figure 2:
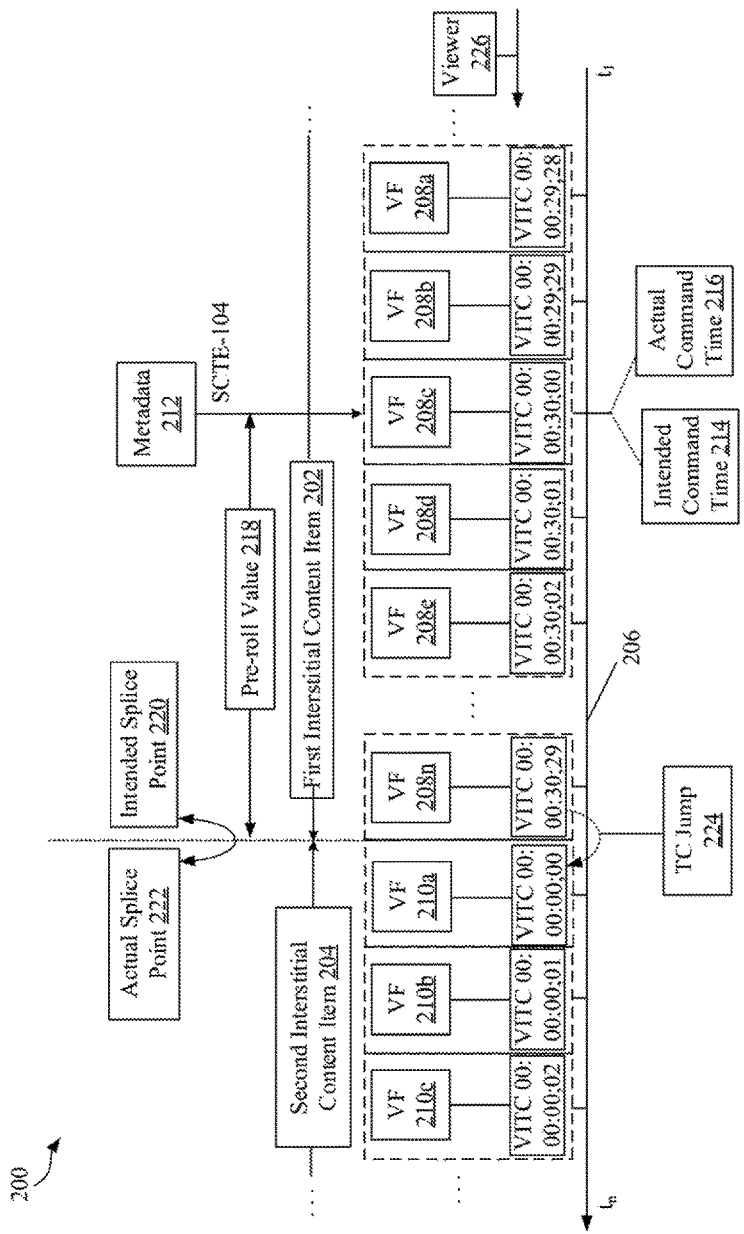
FIG. 2 illustrates an exemplary video feed including a plurality of interstitial content items with metadata, inserted by the television playout system of FIG. 1B, in accordance with an exemplary embodiment of the disclosure.

FIG. 2 illustrates an exemplary video feed including a plurality of interstitial content items with inserted metadata by the television playout system 102 of FIG. 1B, in accordance with an exemplary embodiment of the disclosure. Referring to FIG. 2, there is shown a video feed 200 including a plurality of interstitial content items, such as a first interstitial content item 202 and a second interstitial content item 204, displayed across a time bar 206. The first interstitial content item 202 includes a first plurality of video frames (VFs), such as VF 208a, . . . , VF 208n, and the second interstitial content item 204 includes a second plurality of VFs, such as VF 210a, . . . , VF 210n. The first plurality of VFs and the second plurality of VFs include time codes, such as VITC, embedded in the video feed 200. There is further shown the metadata 212 inserted in the first interstitial content item 202 at an intended command time 214 of the time bar 206. The metadata 212 includes a pre-roll value 218. There is further shown an actual command time 216, an intended splice point 220 related to the first interstitial content item 202, an actual splice point 222 related to the first interstitial content item 202, a TC jump 224 associated with the second interstitial content item 204, and a viewer 226. The viewer 226 may view the video feed 200 in the direction of the arrow, as shown.

The playout server 118 may be configured to place the plurality of interstitial content items, such as the first interstitial content item 202 and the second interstitial content item 204, in the video feed 200 at the allotted inventory buckets based on the playout schedule 130 received from the traffic system 106. The metadata inserter 120 may be configured to insert the metadata 212 at a VF, such as the VF 208c, of the first interstitial content item 202 as per the SMPTE 2010 standards. In this regard, the metadata 212 may correspond to the SCTE-104-based digital ad-marker. The VF 208c at which the metadata 212 is inserted may be referred to as the first insertion point. In this scenario, the first insertion point is the intended insertion point of the metadata 212. The VITC, such as VITC "00:00:30; 01", associated with the VF 208c at which the metadata 212 is inserted corresponds to the intended command time 214, which is same as the actual command time 216. The metadata 212 includes the pre-roll value 218. The pre-roll value 218 may have a time base in milliseconds, "1000 ms" for example, and/or a certain count of VFs. The pre-roll value 218 in the metadata 212, which is inserted in the first interstitial content item 202, may indicate a time duration (or a count of VFs) from the intended command time 214 after which the second interstitial content item 204 may begin. Thus, based on the insertion of the metadata 212 at the intended insertion point, a sum of the intended command time 214 and the pre-roll value 218 may indicate the first VF, such as the VF 210*a*, in the second interstitial content item 204. The transition from the first interstitial content item 202 to the second interstitial content item 204 in the video feed 200 is represented by the intended splice point 220. The intended splice point 220 may be determined based on the sum of the intended command time 214 and the pre-roll value 218. In this scenario, the intended splice point 220 is same as the actual splice point 222, based on the accurate insertion of the metadata 212 at the intended insertion point. The transition in the VITC related to the last VF (i.e., the VF 208*n*) in the first interstitial content item 202 to the VITC related to the first VF (i.e., the VF 210*a*) in the second interstitial content item 204 represents the TC jump 224 associated with the second interstitial content item 204. The TC jump 224 may indicate a variation in the VITC associated with the first interstitial content item 202 and the second interstitial content item 204. For example, the VITCs associated with the first plurality of VFs 208*a*, . . . , 208*n* in the first interstitial content item 202 are {(00:00:29;29), (00:00:29;30), (00:00:30;01), (00:00:30;02), (00:00:30;03), . . . , (00:00:30;n)} and the VITCs associated with the second plurality of VFs 210*a*, . . . , 210*n* in the second interstitial content item 204 are {(00:00:00;00), (00:00:00;01), . . . , (00:00:00;29)}, as shown. Thus, there is a variation in the VITC, such as (00:00:30;30), associated with the VF 208*n* of the first interstitial content item 202 and the VITC, such as (00:00:00;00), associated with the VF 210*a* of the second interstitial content item 204. This variation may represent the TC jump 224 associated with the second interstitial content item 204. In this regard, the TC jump 224 associated with the second interstitial content item 204 may further correspond to a start of the second interstitial content item 204.

Any offset in the insertion of the metadata 212 may be detected by the splice monitor 122 (FIGS. 1A and 1B). The splice monitor 122 may be configured to detect the offset based on a misalignment between the TC jump 224, and the sum of the intended command time 214 and the pre-roll value 218. The detected offset may be used by the automation system 116 to calibrate the one or more parameters associated with the insertion of the metadata 212 for adjusting the actual splice point 222, as described in FIG. 1. The actual splice point 222 after adjustment may be in alignment with the TC jump 224 and may further coincide with the intended splice point 220, in case the actual splice point 222 and the intended splice point 220 is previously different. An example of the validation and calibration of splice points in interstitial content items is shown and described in FIGS. 4A and 4B. In video feed 200, the intended splice point 220 is in alignment with the TC jump 224 associated with the second interstitial content item 204. Thus, the detected offset may be may be "zero".

Figure 3:
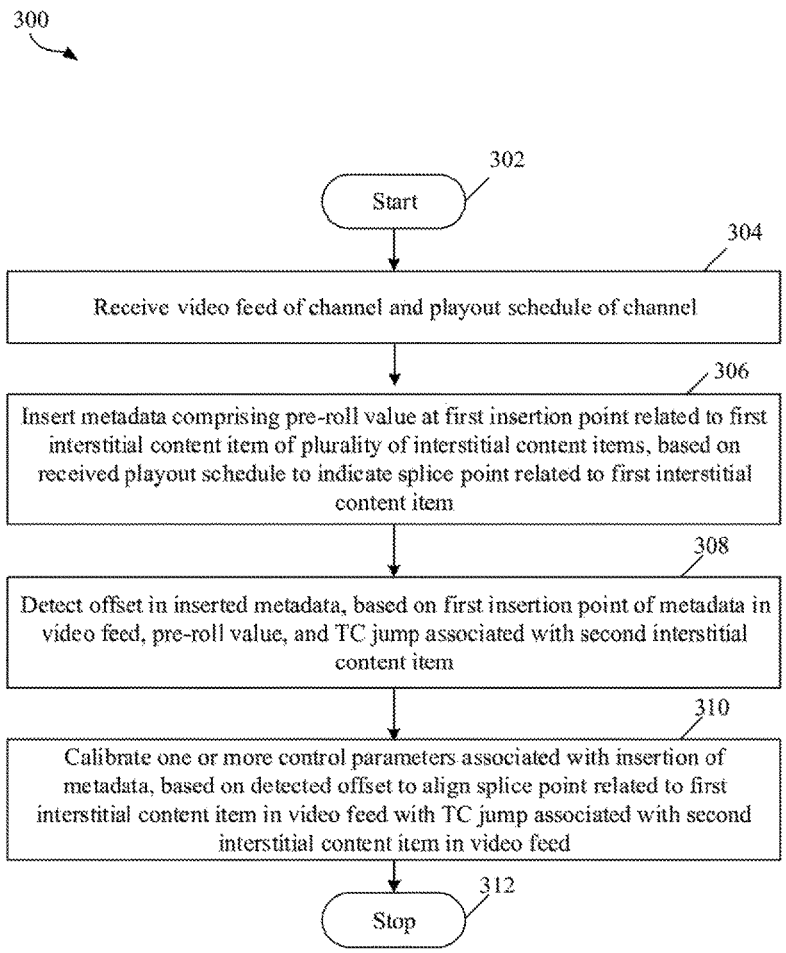
FIG. 3 depicts a flow chart illustrating high-level operations of the television playout system of FIG. 1B, in accordance with an exemplary embodiment of the disclosure.

FIG. 3 depicts a flow chart illustrating high-level operation of the television playout system 102 of FIG. 1B, in accordance with an exemplary embodiment of the disclosure. Referring to FIG. 3, there is shown a flow chart 300 comprising exemplary operations 302 through 312. The exemplary operations may start at 302 and proceed to 304.

At 304, a video feed of a channel and the playout schedule 130 of the channel may be received. The playout server 118 may be configured to receive the video feed of the channel from the BIMAMCS 110. The video feed of the channel may comprise programming data and the plurality of interstitial content items 132. The automation system 116 may be configured to receive the playout schedule 130 of the channel from the traffic system 106.

At 306, metadata comprising a pre-roll value may be inserted at a first insertion point related to a first interstitial content item of the plurality of interstitial content items, based on the received playout schedule 130 to indicate a splice point related to the first interstitial content item. The metadata inserter 120 may be configured to insert the metadata, such as the metadata 212, comprising the pre-roll value (such as the pre-roll value 218) at the first insertion point related to the first interstitial content item (such as the first interstitial content item 202) of the plurality of interstitial content items, based on the received playout schedule 130 to indicate the splice point related to the first interstitial content item 202. The metadata inserter 120 may insert the metadata 212 in accordance with the SMPTE-2010 standards. The splice point related to the first interstitial content item 202 may represent a transition from the first interstitial content item 202 to the second interstitial content item 204 of the plurality of interstitial content items. The second interstitial content item 204 may follow the first interstitial content item 202 in the video feed 134 based on the playout schedule 130. The first insertion point of the metadata 212 is an actual insertion point. Thus, the first insertion point of the metadata 212 may be same or different from an intended insertion point. In case, the first insertion point is different from the intended insertion point, then the first insertion point corresponds to an erroneous insertion point. For example, if the metadata 212 is inserted at the intended insertion point of the video feed 134, the splice point related to the first interstitial content item 202 is in alignment with the TC jump, such as the TC jump 224, associated with the second interstitial content item 204 and may be referred to as the intended splice point 220. The alignment of the splice point related to the first interstitial content item 202 with the TC jump 224 associated with the second interstitial content item 204 may represent an accurate transition from the first interstitial content item 202 to the second interstitial content item 204. For example, a last VF, such as the VF 208*n*, of the first interstitial content item 202 may accurately transition to a first VF, such as the VF 210*a*, of the second interstitial content item 204. However, in certain scenarios, the metadata 212 may be inserted at an erroneous insertion point due to an early insertion or a delayed insertion, such that the erroneous insertion point may represent any insertion point other than the intended insertion point. The erroneous insertion of the metadata 212 is described in FIGS. 4A and 4B.

At 308, an offset may be detected in the inserted metadata, based on the first insertion point of the metadata in the video feed, the pre-roll value, and the TC jump associated with the second interstitial content item. The splice monitor 122 may be configured to detect the offset, such as the offset 138, in the inserted metadata 212, based on the first insertion point of the metadata 212 in the video feed, the pre-roll value 218, and the TC jump 224 associated with the second interstitial content item 204. For example, the detected offset may correspond to a difference between the first insertion point of the metadata 212 and the intended insertion point of the metadata 212 related to the first interstitial content item 202. The detected offset may further correspond to a time gap or a frame gap between the actual splice point 222 related to the first interstitial content item 202 and the TC jump 224 associated with the second interstitial content item 204, based on the erroneous insertion of the metadata 212. The detection of the offset is described in FIGS. 4A and 4B. The splice monitor 122 may generate an alarm and/or a log report based on the detection of the offset in the inserted metadata 212. The splice monitor 122 may further communicate the detected offset (or the log report) to the automation system 116.

At 310, one or more control parameters associated with the insertion of the metadata may be calibrated, based on the detected offset to align the splice point related to the first interstitial content item in the video feed with the TC jump associated with the second interstitial content item in the video feed. The automation system 116 may be configured to calibrate the one or more control parameters associated with the insertion of the metadata 212, based on the detected offset (or the log report). The calibration of the one or more control parameters associated with the insertion of the metadata 212 may align the actual splice point 222 related to the first interstitial content item 202 in the video feed 134 with the TC jump 224 associated with the second interstitial content item 204 in the video feed 134. The one or more control parameters may include the first insertion point of the metadata 212, the pre-roll value 218, and/or the playout schedule 130. For example, the automation system 116 may calibrate the pre-roll value 218 in the metadata 212 based on the detected offset, such that after calibration the actual splice point 222 related to the first interstitial content item 202 coincides with the intended splice point 220 related to the first interstitial content item 202. Alternatively stated, after calibration of the pre-roll value 218, the actual splice point 222 related to the first interstitial content item 202 is aligned to the TC jump 224 associated with the second interstitial content item 204. The calibration of the one or more control parameters is described in FIGS. 4A and 4B. The video feed with aligned splice points may be communicated to one or more encoders, such as the one or more encoders 124a, . . . , 124n, for encoding the video feed for distribution. Control passes to end step 312.

Figure 4A:
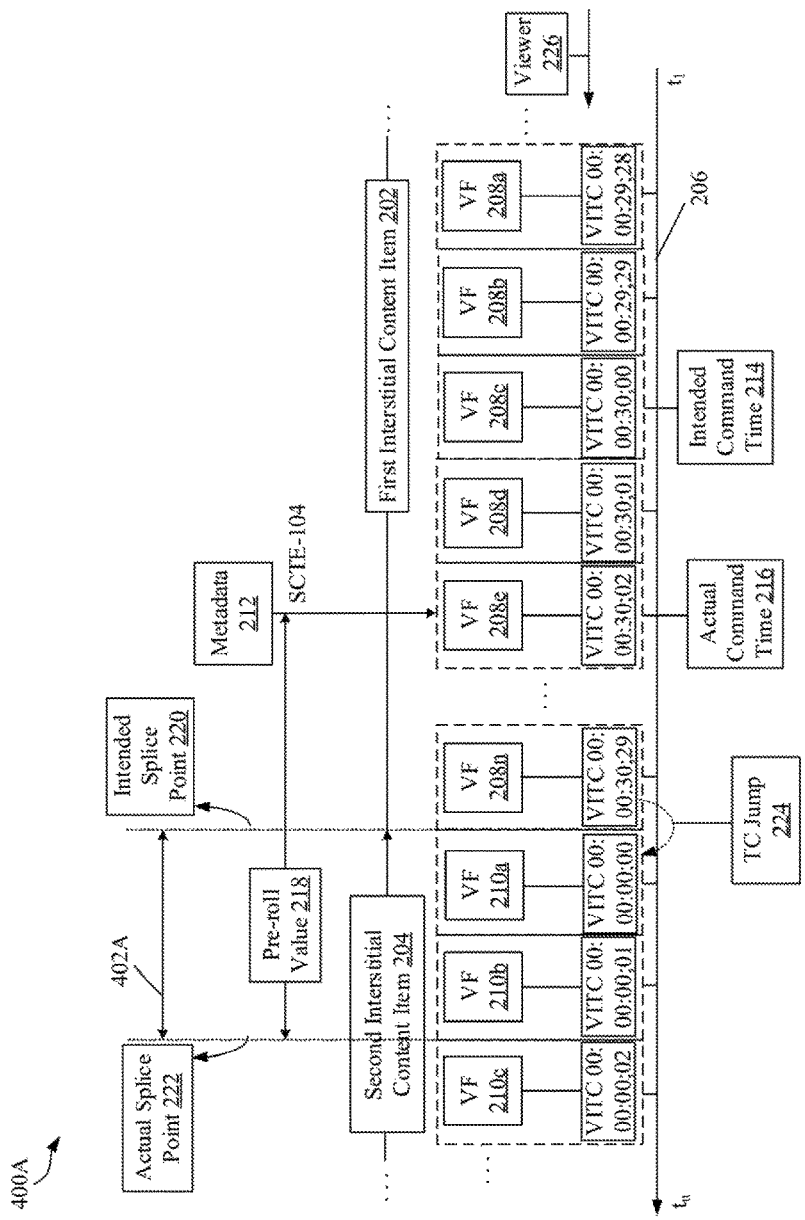
FIG. 4A illustrates a first exemplary scenario for validation and calibration of splice points in interstitial content, in accordance with an exemplary embodiment of the disclosure.

FIG. 4A illustrates a first exemplary scenario for validation and calibration of splice points in interstitial content, in accordance with an exemplary embodiment of the disclosure. Referring to FIG. 4A, there is shown a video feed 400A including a plurality of interstitial content items, the metadata 212 inserted at the actual command time 216 of the video feed 400A. The metadata 212 includes the pre-roll value 218 indicating the actual splice point 222. There is further shown an offset 402A. There is further shown the first interstitial content item 202, the second interstitial content item 204, the time bar 206, the first plurality of VFs 208a, . . . , 208n, the second plurality of VFs 210a, . . . , 210n, the intended command time 214, the intended splice point 220, the TC jump 224, and the viewer 226, as described in FIG. 2.

The metadata inserter 120 may be configured to insert the metadata 212 at a VF 208e of the first interstitial content item 202 as per the SMPTE 2010 standards provided by the automation system 116. In this regard, the metadata 212 may correspond to the SCTE-104-based digital ad-marker and the VF 208e at which the metadata 212 is inserted may correspond to an SCTE command frame. The metadata 212 includes the pre-roll value 218. The pre-roll value 218 may have a time base in milliseconds, "1000 ms" for example, and/or a count of VFs. The pre-roll value 218 in the metadata 212, which is inserted in the first interstitial content item 202, may indicate a time duration (or a count of VFs) from the VF 208e (i.e., the first insertion point) after which the second interstitial content item 204 may begin. The VITC associated with the VF 208e corresponds to the actual command time 216. The VITC associated with the VF 208c corresponds to the intended command time 214. The VF 208c may correspond to an intended insertion point of the metadata 212. In this regard, if the metadata 212 is inserted at the VF 208c, the intended splice point 220, which is a desired splice point, may then be aligned with the TC jump 224 associated with the second interstitial content item 204. However, due to an error in the insertion (such as a delayed insertion), the metadata 212 is inserted at the actual command time 216. Due to the error in the insertion, the actual splice point 222 is out of alignment with the TC jump 224 associated with the second content item 204. This error may lead to an erroneous playout of the video feed 400A. For example, the first interstitial content item 202 may be over played or played for a shorter duration than a specified duration adversely affecting the inventory.

The splice monitor 122 may be configured to monitor the inserted metadata 212. The splice monitor 122 may further detect the offset 402A in the inserted metadata 212 based on the actual command time 216, the pre-roll value 218, and the TC jump 224 associated with the second interstitial content item 204. For example, Table 1, as shown below illustrates a detection of the offset 402A by the splice monitor 122.

TABLE 1

Illustration of video feed including VFs and ancillary data

| Frame count | VITC | Metadata |
|---|---|---|
| 123456 | 00:00:29;28 | |
| 123457 | 00:00:29;29 | |
| 123458 | 00:00:30;00 | |
| 123459 | 00:00:30;01 | |
| 123460 | 00:00:30;02 | Pre-roll value 1000 ms |
| . . . | . . . | |
| 123487 | 00:00:30;29 | |
| 123488 | 00:00:00;00 | |
| 123489 | 00:00:00;01 | |
| 123490 | 00:00:00;02 | |
| . . . | . . . | |

With reference to Table 1, the splice monitor 122 may determine a frame count, such as "123460", associated with the actual command time 216 of the metadata 212. The splice monitor 122 may further determine a frame count, such as "123488", associated with the first frame of the second interstitial content item 204 based on the TC jump 224 associated with the second interstitial content item 204. The splice monitor 122 may use equation (1) and (2), as shown below for the detection of the offset 402A:

$$\text{Count of frames associated with pre-roll} = \frac{\text{Pre-roll value}}{\text{video feed frame period}} = \frac{1000 \text{ ms}}{\frac{1000 \text{ ms}}{\frac{30}{1.001}}} = 30 \text{ frames} \quad (1)$$

$$\text{Count of frames between splice point and actual command time} = 123488 - 123460 = 28 \text{ multimedia frames} \quad (2)$$

where,
"video feed frame period" represents a time required to display a full frame of a video feed.

In an exemplary embodiment, the splice monitor 122 may be configured to use equations (1) and (2) to determine the offset 402A. The offset 402A may correspond to a difference of equations (1) and (2), such as a difference of "two VFs". The offset 402A may represent a time gap or a frame gap (i.e., "two VFs") between the actual splice point 222 and the TC jump 224. The offset 402A may further represent a frame gap between the actual command time 216 and the intended command time 214 (i.e., "two VFs").

The splice monitor 122 may further provide the offset 402A to the automation system 116. The automation system 116 may calibrate the one or more control parameters associated with the insertion of the metadata 212, based on the detected offset 402A. The one or more control parameters may include the first insertion point (i.e., the VF 208e associated with the actual command time 216) associated with the metadata 212, the pre-roll value 218, and/or the playout schedule 130. The automation system 116 may calibrate the one or more control parameters to align the actual splice point 222 related to the first interstitial content item 202 in the video feed 400A with the TC jump 224 associated with the second interstitial content item 204. In this regards, the automation system 116 may align the actual splice point 222 with the intended splice point 220. For example, the automation system 116 may calibrate the pre-roll value 218 based on equation (3), as shown below:

$$\text{Calibrated pre-roll value} = 28 \times \frac{1000}{\frac{30}{1.001}} = 935 \text{ ms} \quad (3)$$

The automation system 116 may be configured to calibrate the pre-roll value 218 (i.e., "1000 ms") to "935 ms". Alternatively stated, the automation system 116 may update the pre-roll value associated with the metadata 212 with "935 ms", such that the inserted metadata 212 has the calibrated pre-roll value. In another scenario, the automation system 116 may be configured to instruct the metadata inserter 120 to re-insert the metadata 212, two VFs prior to the previous insertion (i.e., at the VF 208e) of the metadata 212. In yet another scenario, the automation system 116 may be configured to instruct the traffic system 106 to calibrate the playout schedule 130 to compensate the detected offset 402A. After the calibration, the actual splice point 222 may be aligned to the TC jump 224. Thus, the actual splice point 222 and the intended splice point 220 may coincide after calibration of the pre-roll value 218, such that the transition from the first interstitial content item 202 to the second interstitial content item 204 occurs at the intended splice point 220. The viewer 226 may view the video feed 400A in the direction of the arrow.

Figure 4B:
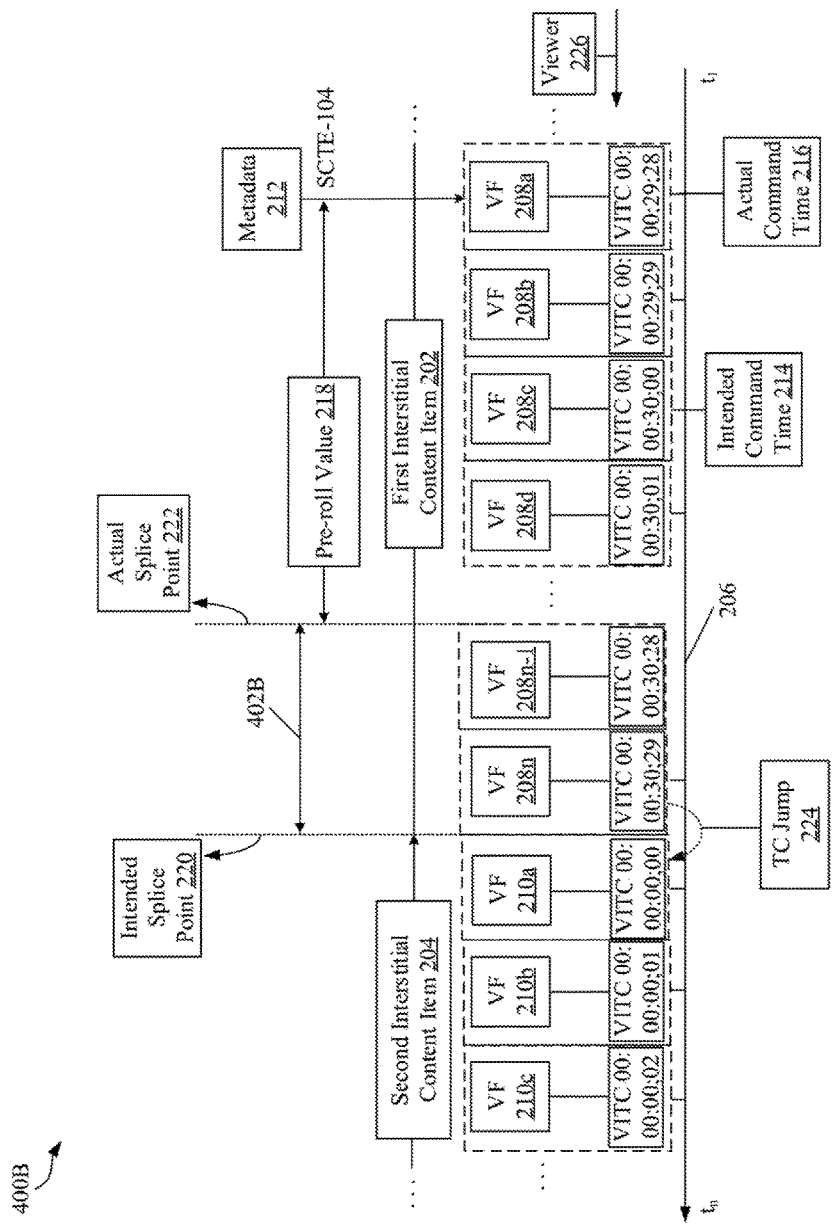
FIG. 4B illustrates a second exemplary scenario for validation and calibration of splice points in interstitial content, in accordance with an exemplary embodiment of the disclosure.

FIG. 4B illustrates a second exemplary scenario for validation and calibration of splice points in interstitial content, in accordance with an exemplary embodiment of the disclosure. Referring to FIG. 4B, there is shown a video feed 400B including a plurality of interstitial content items, metadata 212 inserted at an actual command time 216 of the video feed 400B. The metadata 212 includes a pre-roll value 218 indicating the actual splice point 222. There is further shown an offset 402B. There is further shown the first interstitial content item 202, the second interstitial content item 204, the time bar 206, the first plurality of VFs 208a, . . . , 208n, the second plurality of VFs 210a, . . . , 210n, the intended splice point 220, the intended command time 214, and the TC jump 224, as described in FIG. 2.

The metadata inserter 120 may insert the metadata 212 at a VF, such as the VF 208a, of the first interstitial content item 202 as per the SMPTE 2010 standards provided by the automation system 116. In this regard, the metadata 212 may correspond to the SCTE-104-based digital ad-marker and the VF 208a at which the metadata 212 is inserted may correspond to an SCTE command frame. The metadata 212 includes the pre-roll value 218. The pre-roll value 218 may have a time base in milliseconds, "1000 ms" for example, and/or a count of VFs. The pre-roll value 218 in the metadata 212, which is inserted in the first interstitial content item 202, may indicate a time duration (or a count of VFs) from the VF 208a (i.e., the first insertion point) after which the second interstitial content item 204 may begin. The VITC associated with the VF 208a corresponds to the actual command time 216. The VITC associated with the VF 208c corresponds to the intended command time 214. The VF 208c may correspond to an intended insertion point of the metadata 212. In this regard, if the metadata 212 is inserted at the VF 208c, the intended splice point 220, which is a desired splice point, would have been aligned with the TC jump 224 associated with the second interstitial content item 204. However, due to an error in the insertion (such as an early insertion in this case), the metadata 212 is inserted at the actual command time 216. Due to the error in the insertion, the actual splice point 222 is out of alignment or misaligned with the TC jump 224 associated with the second content item 204. This error may lead to an erroneous playout of the video feed 400B. For example, the first interstitial content item 202 may be clipped and the impression time of the first interstitial content item 202, may be inaccurate.

The splice monitor 122 may be configured to monitor the inserted metadata 212. The splice monitor 122 may be further configured to detect the offset 402B in the inserted metadata 212 based on the actual command time 216, the pre-roll value 218, and the TC jump 224 associated with the second interstitial content item 204. For example, Table 2, as shown below illustrates a detection of the offset 402B by the splice monitor 122.

TABLE 2

Illustration of video feed including VFs and ancillary data

| Frame count | VITC | Metadata |
|---|---|---|
| 123456 | 00:00:29;28 | Pre-roll value 1000 ms |
| 123457 | 00:00:29;29 | |
| 123458 | 00:00:30;00 | |
| 123459 | 00:00:30;01 | |
| 123460 | 00:00:30;02 | |
| . . . | . . . | |
| 123486 | 00:00:30;28 | |
| 123487 | 00:00:30;29 | |
| 123488 | 00:00:00;00 | |
| 123489 | 00:00:00;01 | |
| . . . | . . . | |

With reference to Table 2, the splice monitor 122 may determine a frame count, such as "123456", associated with the actual command time 216 of the metadata 212. The splice monitor 122 may further determine a frame count, such as "123488", associated with the first frame of the second interstitial content item 204 based on the TC jump 224 associated with the second interstitial content item 204. In an exemplary embodiment, the splice monitor 122 may be configured to use equation (1) and (2), as shown above for the detection of the offset 402B. The offset 402B may correspond to a difference of equations (1) and (2), such as a difference of "two VFs". The offset 402B may represent a time gap or a frame gap (i.e., "two VFs") between the actual splice point 222 and the TC jump 224. The offset 402B may further represent a frame gap between the actual command time 216 and intended command time 214 (i.e., "two VFs").

The splice monitor 122 may be further configured to provide the offset 402B to the automation system 116. The automation system 116 may be configured to calibrate the one or more control parameters associated with the insertion of the metadata 212, based on the detected offset 402B. The one or more control parameters may include the first insertion point (i.e., the VF 208a associated with the actual command time 216) associated with the metadata 212, the pre-roll value 218, and/or the playout schedule 130. The automation system 116 may be configured to calibrate the one or more control parameters to align the actual splice point 222 related to the first interstitial content item 202 in the video feed 400B with the TC jump 224 associated with the second interstitial content item 204. In this regards, the automation system 116 may align the actual splice point 222 with the intended splice point 220. For example, the automation system 116 may calibrate the pre-roll value 218 based on equation (3), as shown above. The automation system 116 may be configured to calibrate the pre-roll value 218 (i.e., "1000 ms") to "1065 ms". In another scenario, the automation system 116 may be configured to instruct the metadata instructor to re-insert the metadata 212, two VFs later than the previous insertion (i.e., at the VF 208a) of the metadata 212. In yet another scenario, the automation system 116 may be configured to instruct the traffic system 106 to calibrate the playout schedule 130 to compensate the detected offset 402B. After the calibration, the actual splice point 222 may be aligned to the TC jump 224. Thus, the actual splice point 222 and the intended splice point 220 may coincide after calibration of the pre-roll value 218, such that the transition from the first interstitial content item 202 to the second interstitial content item 204 occurs at the intended splice point 220.

Figure 5A:
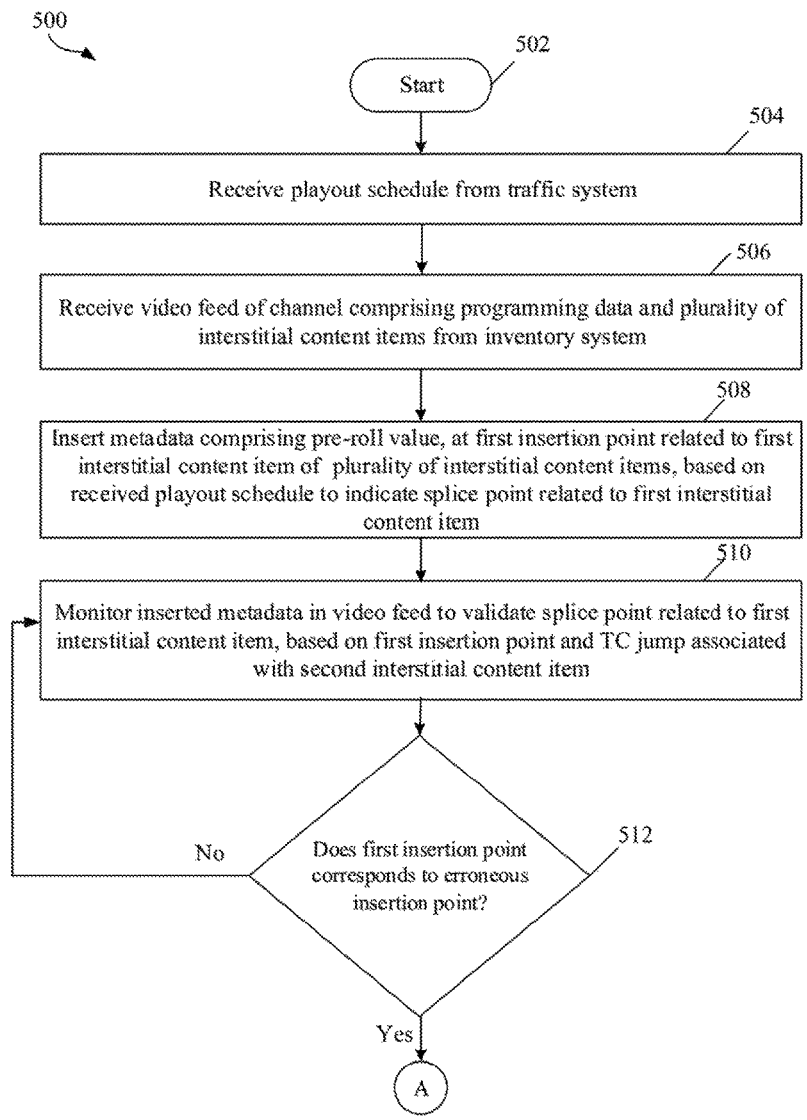
FIGS. 5A and 5B, collectively, depict a flow chart illustrating exemplary operations for validation and calibration of splice points in interstitial content by a television playout system, in accordance with an exemplary embodiment of the disclosure.
Figure 5B:
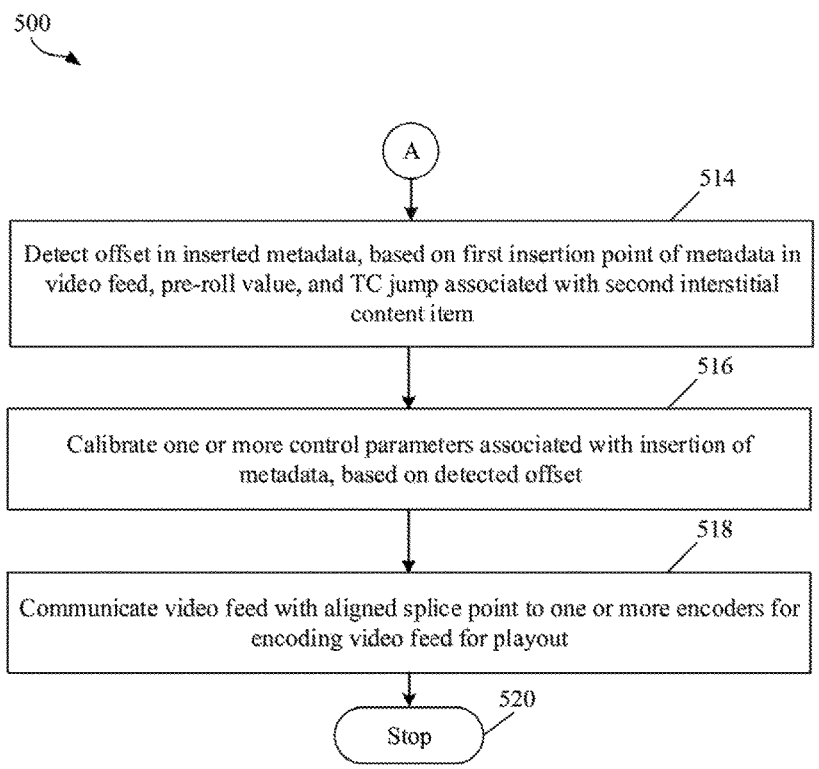

FIGS. 5A and 5B, collectively, depict a flow chart illustrating exemplary operations for validation and calibration of splice points in interstitial content by the television playout system, in accordance with an exemplary embodiment of the disclosure. Referring to FIGS. 5A and 5B, there is shown a flow chart 500 comprising exemplary operations 502 through 520. The exemplary operations may start at 502 and proceed to 504.

At 504, a playout schedule 130 may be received from the traffic system 106. The automation system 116 may be configured to receive the playout schedule 130 (as described in FIG. 1B) from the traffic system 106. The playout schedule 130 may be generated by the spot scheduler 108 based on the solved placement of a plurality of interstitial content items in the plurality of inventory buckets associated with a commercial break during programming data.

At 506, a video feed of a channel comprising the programming data and the plurality of interstitial content items 132 may be received from the BIMAMCS 110. The playout server 118 may be configured to receive the video feed of the channel comprising the programming data and the plurality of interstitial content items from the BIMAMCS 110. The programming data and the plurality of interstitial content items 132 included in the video feed may be received in accordance with the playout schedule 130. For example, the playout schedule 130 received by the automation system 116 may include a schedule pertaining to a playout of a first interstitial content item and a second interstitial content item during a commercial break between a playout of a first program segment and a second program segment. In such a case, the video feed received by the playout server 118 may comprise the programming data including the first program segment and the second program segment, and the plurality interstitial content items including the first interstitial content item and the second interstitial content item. The programming data and the plurality of interstitial content items 132 in the video feed may be ordered in accordance with the playout schedule 130.

In accordance with an embodiment, the programming data and the plurality of interstitial content items 132 may not be aligned in accordance with the playout schedule 130. For example, the ordering of the first interstitial content item, the second interstitial content item, the first program segment, and the second program segment may not be in accordance with the playout schedule 130. In such a case, the playout server 118 may be configured to order the first interstitial content item, the second interstitial content item, the first program segment, and the second program segment based on the playout schedule 130.

The received video feed may correspond to an uncompressed SDI video. The received video feed may include ancillary data such as the close caption data, format definition data, and VITC. In accordance with an embodiment, the playout server 118 may be configured to embed the ancillary data, such as VITC, into the received video feed. The playout server 118 may communicate the received video feed to the metadata inserter 120.

At 508, the metadata inserter 120 may insert metadata, such as the metadata 212, comprising a pre-roll value, such as the pre-roll value 218, at a first insertion point related to a first interstitial content item of the plurality of interstitial content items. The insertion of metadata may be done based on the received playout schedule 130 to indicate a splice point related to the first interstitial content item. The first insertion point is an actual insertion point which may be same or different from an intended insertion point. In case, the first insertion point is different from the intended insertion point, then the first insertion point corresponds to an erroneous insertion point. The first insertion point is the intended insertion point when the splice point related to the first interstitial content item is aligned with the TC jump associated with a second interstitial content item of the plurality of interstitial content items. The first insertion point is the erroneous insertion point when the splice point related to the first interstitial content item is not aligned with the TC jump associated with the second interstitial content item. The second interstitial content item may follow the first interstitial content item in the video feed.

At 510, the splice monitor 122 may monitor the inserted metadata 212 in the video feed to validate the splice point related to the first interstitial content item, based on the first insertion point and the TC jump associated with the second interstitial content item. At 512, it may be determined whether, the first insertion point corresponds to the intended insertion point or the erroneous insertion point. The control passes to step 514 based on a determination that the first insertion point corresponds to the erroneous insertion point. Else, the splice point related to the first interstitial content item is valid and the control passes to step 510 to monitor another inserted metadata 212 in the interstitial content item (such as the second interstitial content item) that follows the first interstitial content item.

At 514, the splice monitor 122 may detect an offset (such as the offset 402A or the offset 402B, as shown in FIGS. 4A and 4B, respectively) in the inserted metadata 212, based on the first insertion point of the metadata 212 in the video feed, the pre-roll value 218, and the TC jump 224 associated with the second interstitial content item. In an exemplary embodiment, the splice monitor 122 may use equations (1) and (2), for the detection of the offset, as described in FIG. 4A. The splice monitor 122 may further communicate the detected offset to the automation system 116. At 516, the automation system 116 may calibrate the one or more control parameters associated with the insertion of the metadata, based on the detected offset. The one or more control parameters may include the first insertion point of the metadata 212, the pre-roll value 218, and/or the playout schedule 130. The calibration of the one or more control parameters may align the splice point related to the first interstitial content item in the video feed with the TC jump (such as the TC jump 224, as shown in FIGS. 4A and 4B) associated with the second interstitial content item in the video feed. The calibration of the one or more control parameters is described in FIGS. 4A and 4B.

At 518, the video feed with the aligned splice point may be communicated to one or more encoders, such as the one or more encoders 124a, . . . , 124n, for encoding the video feed for distribution. The one or more encoders 124a, . . . , 124n may compress the video feed, which may then be communicated to the plurality of consumer devices 114a, . . . , 114n. The control passes to end step 520.

Figure 6:
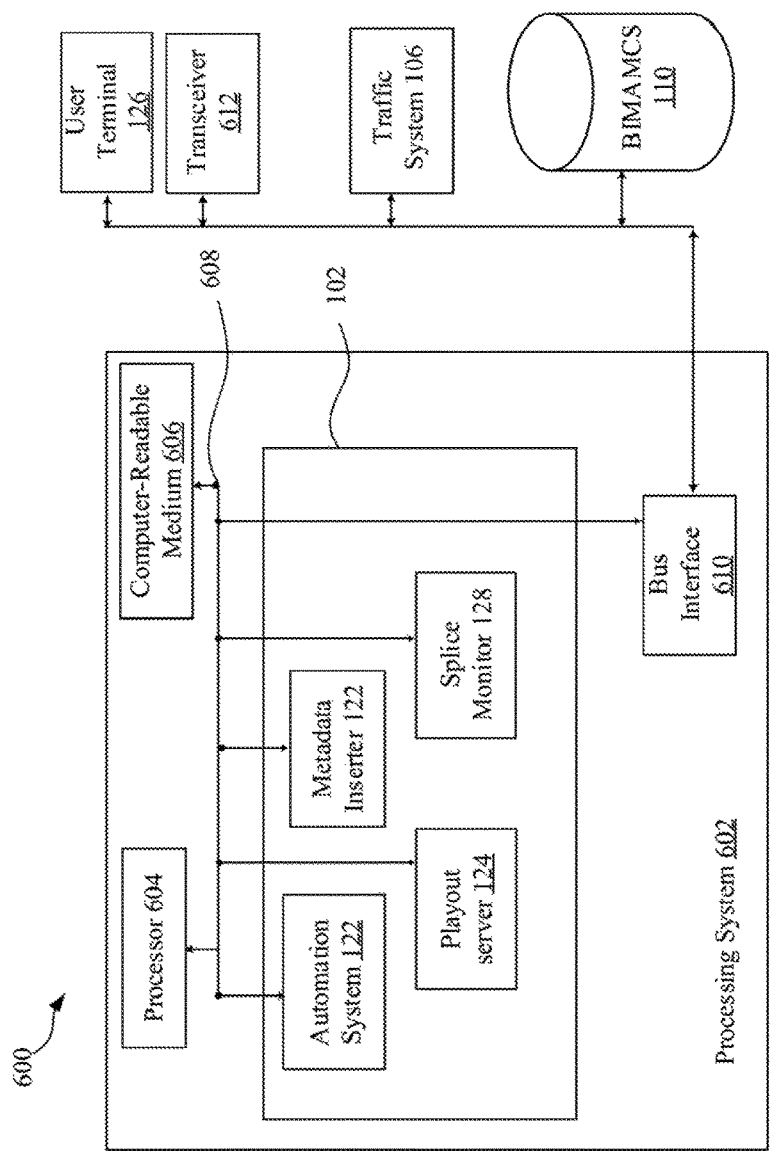
FIG. 6 is a conceptual diagram illustrating an example of a hardware implementation for a television playout system employing a processing system for validation and calibration of splice points in interstitial content, in accordance with an exemplary embodiment of the disclosure.

FIG. 6 illustrates is a conceptual diagram illustrating an example of a hardware implementation for a television playout system employing a processing system for validation and calibration of splice points in interstitial content, in accordance with an exemplary embodiment of the disclosure. Referring to FIG. 6, the hardware implementation shown by a representation 600 for the television playout system 102 employs a processing system 602 for validating and calibrating splice points in interstitial content in a video feed of a channel, in accordance with an exemplary embodiment of the disclosure, as described herein. In some examples, the processing system 602 may comprise one or more hardware processors 604, a non-transitory computer-readable medium 606, a hardware automation system 116, a hardware playout server 118, a hardware metadata inserter 120, and a hardware splice monitor 122. The processing system 602 may be communicatively coupled to the hardware traffic system 106, and the hardware BIMAMCS 110.

In this example, the television playout system 102 employing the processing system 602 may be implemented with a bus architecture, represented generally by bus 608. The bus 608 may include any number of interconnecting buses and bridges depending on the specific implementation of the television playout system 102 and the overall design constraints. The bus 608 links together various circuits including the one or more processors, represented generally by the processor 604, the non-transitory computer-readable media, represented generally by the computer-readable medium 606, the hardware automation system 116, the hardware playout server 118, the hardware metadata inserter 120, and the hardware splice monitor 122, which may be configured to carry out one or more operations or methods described herein. A bus interface 610 provides an interface between the bus 608 and a transceiver 612. The transceiver 612 facilitates communication via the network 112 with various other apparatus, such as the plurality of advertiser order generation systems 104a, . . . , 104n, the plurality of consumer devices 114a, . . . , 114n, and the one or more encoders 124a, . . . , 124n.

The user terminal 126 may comprise a keypad, display, speaker, microphone, pointing to enable a user, such as the monitoring user 128 to interact with the television playout system 102. The user terminal 126 may be configured to present a user interface that enables the monitoring user 128, such as the content scheduler to configure and interact with components such as the automation system 116 and the metadata inserter 120.

The processor 604 may be configured to manage the bus 608 and general processing, including the execution of a set of instructions stored on the computer-readable medium 606. The set of instructions, when executed by the processor 604, causes the television playout system 102 to execute the various functions described herein for any particular apparatus. The computer-readable medium 606 may also be used for storing data that is manipulated by the processor 604 when executing the set of instructions. The computer-readable medium 606 may also be configured to store data for one or more of the hardware automation system 116, the hardware playout server 118, the hardware metadata inserter 120, and/or the hardware splice monitor 122.

In an aspect of the disclosure, the processor 604, the computer-readable medium 606, or a combination of both may be configured or otherwise specially programmed to execute the operations or functionality of the hardware automation system 116, the hardware playout server 118, the hardware metadata inserter 120, the hardware splice monitor 122, or various other components described herein. For example, processor 604, computer-readable medium 606, or a combination of both may be configured or otherwise specially programmed to execute the operations and functionality of the hardware automation system 116, the hardware playout server 118, the hardware metadata inserter 120, the hardware splice monitor 122 as described with respect to FIGS. 1A, 1B, 2, 3, 4A, 4B, 4C, 5A, and 5B.

Various embodiments of the disclosure comprise a television playout system 102 that may be configured to handle a playout of a channel (such as a television channel). The television playout system 102 may comprise, for example, the automation system 116, the playout server 118, the metadata inserter 120, and the splice monitor 122. The automation system 116 may be configured to receive the playout schedule 130 from the traffic system 106. The playout server 118 may be configured to receive the video feed (such as the video feed 200, 400A, or 400B) including the programming data and the plurality of interstitial content items 132 from the BIMAMCS 110. The metadata inserter 120 may be configured to insert metadata 212 comprising a pre-roll value 218, at a first insertion point related to the first interstitial content item 202 of the plurality of interstitial content items, based on the received playout schedule 130 to indicate the intended splice point 220 (or the actual splice point 222) related to the first interstitial content item 202. Examples of the first insertion point are shown as the VF 208c associated with the intended command time 214 in FIG. 2, the VF 208e associated with the actual command time 216 in FIG. 4A, and the VF 208a associated with the actual command time 216 in FIG. 4B. The splice monitor 122 may be configured to detect the offset 402A (or the offset 402B) in the inserted metadata 212, based on the first insertion point of the metadata 212 in the video feed 400A (or the video feed 400B), the pre-roll value 218, and the TC jump 224 associated with the second interstitial content item 204 in the video feed 400A (or the video feed 400B). The automation system 116 may be configured to calibrate the one or more control parameters associated with the insertion of the metadata 212, based on the detected offset 402A (or the offset 402B) to align the actual splice point 222 related to the first interstitial content item 202 in the video feed with the TC jump 224 associated with the second interstitial content item 204 in the video feed. The one or more control parameters correspond to the first insertion point of the metadata 212, the pre-roll value 218, and/or the playout schedule 130.

The received video feed 400A (or the video feed 400B) corresponds to an uncompressed SDI video. The video feed 400A (or the video feed 400B) may further include ancillary data comprising close caption data, format definition data, and VITCs. The time instant of the video feed that is related to the first insertion point (such as the VF 208e and the VF 208a) corresponds to a command time (such as the actual command time 216). The actual splice point 222 related to the first interstitial content item 202 corresponds to a transition from the first interstitial content item 202 to the second interstitial content item 204. The second interstitial content item 204 follows the first interstitial content item 202 in the received video feed. The plurality of interstitial content items may correspond to an advertisement and/or a promotional media.

The detected offset 402A (or the detected offset 402B) corresponds to a difference between the first insertion point (such as the VF 201e or the VF 208a) of the metadata 212 and an intended insertion point (such as the VF 210c) of the metadata 212 related to the first interstitial content item 202 of the plurality of interstitial content items in the video feed. The detected offset 402A (or the detected offset 402B) further corresponds to a time gap or a frame gap (such as "two VFs") between the splice point (such as the actual splice point 222) related to the first interstitial content item 202 and the TC jump 224 associated with the second interstitial content item 204. The TC jump 224 associated with the second interstitial content item 204 corresponds to a jump in VITC associated with the first interstitial content item 202 and the second interstitial content item 204. The inserted metadata 212 corresponds to an SCTE-104-based digital ad-marker. The television playout system 102 may communicate the video feed with the aligned splice point to one or more encoders 124a, . . . , 124n for distribution.

Various embodiments of the disclosure may provide a non-transitory computer-readable medium having stored thereon, computer readable instructions executable by one or more processors that cause a television playout system to execute operations to handle playout of a channel. The television playout system 102 may execute operations comprising receiving a video feed of the channel comprising programming data and a plurality of interstitial content items, and a playout schedule 130 of the channel. Metadata 212 comprising a pre-roll value 218 may be inserted, at a first insertion point related to a first interstitial content item 202 of the plurality of interstitial content items, based on the received playout schedule 130 to indicate a splice point related to the first interstitial content item 202. An offset 402A or 402B in the inserted metadata 212 may be detected, based on the first insertion point of the metadata 212 in the video feed, the pre-roll value, and a TC jump 224 associated with a second interstitial content item in the video feed. One or more control parameters associated with the insertion of the metadata 212 may be calibrated, based on the detected offset to align the splice point related to the first interstitial content item in the video feed with the TC jump 224 associated with the second interstitial content item in the video feed.

The splice monitor 122 provides significant productivity and efficiency improvements since the process of detection of error in the insertion of metadata may be automated and the error detection may be fail-safe. In contrast to visual inspection, where the detection of the insertion of the metadata is limited by a human visual perception, the splice monitor 122 may be able to detect any insertion error, however small it may be. Thus, the error correction may be performed at early stages of the introduction of error. Thus, resulting in improvement in ad-revenue and user viewing experience.

The automation system 116 may further enable the television playout system to automatically correct the introduced error. Thus, reducing the chances of inaccuracy due to human intervention. Thus, the automation system 116 and the splice monitor 122 enable the television playout system 102 to operate more efficiently and optimally providing both an economic and a cost advantage. The insertion error correction based on calibration of the one or more control parameters by the automation system 116, further reduces the need of splicing conditioning during the encoding phase of the video feed. Thus, reducing the hardware requirement by each of the one or more encoders 124a, . . . , 124n for the error correction. This enables a faster and timely playout of the video feed of the channel. The ability to quickly validate and calibrate the splicing points of interstitial content in the video feed compute may free up valuable processing resources such as memory and computing power, which may be utilized by the automation system 116 for the better co-ordination of the playout server 118, the metadata inserter 120, and the splice monitor 122.

As utilized herein the terms "circuits" and "circuitry" refer to physical electronic components (i.e. hardware) and any software and/or firmware ("code") which may configure the hardware, be executed by the hardware, and/or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for the allocation of under delivery units utilizing an optimization framework.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithm, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

While the present disclosure has been described with reference to certain embodiments, it will be noted understood by, for example, those skilled in the art that various changes and modification could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system, comprising:
   one or more processors in a television playout system that handles playout of a channel, the one or more processors are configured to:
   receive a video feed of the channel, wherein the video feed comprises programming data, a plurality of interstitial content items, and a playout schedule of the channel;
   insert metadata at a first insertion point-in-time in a playout of a first interstitial content item of the plurality of interstitial content items based on the received playout schedule to indicate a splice point related to the first interstitial content item,
   wherein the inserted metadata comprises a pre-roll value that indicates a time after the first insertion point-in-time, and wherein the time indicates a start of a playout of a second interstitial content item of the plurality of interstitial content items;
   detect an offset between the first insertion point-in-time of the metadata and an intended insertion point-in-time of the metadata related to the first interstitial content item based on the pre-roll value and a time-code (TC) jump associated with the second interstitial content item in the video feed,
   wherein the TC jump corresponds to the start of the second interstitial content item; and
   calibrate one or more control parameters associated with the insertion of the metadata, based on the detected offset to align the splice point related to the first interstitial content item in the video feed with the TC jump associated with the second interstitial content item in the video feed.

2. The system according to claim 1, wherein the received video feed corresponds to an uncompressed serial digital interface (SDI) video.

3. The system according to claim 1, wherein the video feed further includes ancillary data comprising close caption data, format definition data, and vertical interval time codes (VITC).

4. The system according to claim 1, wherein a time instant of the video feed that is related to the first insertion point corresponds to a command time.

5. The system according to claim 1, wherein the splice point related to the first interstitial content item corresponds to a transition from the first interstitial content item to the second interstitial content item, and wherein the second interstitial content item follows the first interstitial content item in the received video feed.

6. The system according to claim 1, wherein the one or more control parameters correspond to at least one of the first insertion point of the metadata, the pre-roll value, or the playout schedule.

7. The system according to claim 1, wherein the plurality of interstitial content items corresponds to at least one of an advertisement or a promotional media.

8. The system according to claim 1, wherein the detected offset further corresponds to a frame gap between the splice point related to the first interstitial content item and the TC jump associated with the second interstitial content item.

9. The system according to claim 1, wherein the TC jump associated with the second interstitial content item further corresponds to a jump in vertical interval time code (VITC) associated with the first interstitial content item and the second interstitial content item.

10. The system according to claim 1, wherein the inserted metadata corresponds to a Society of Cable Telecommunications Engineers (SCTE)-104-based digital ad-marker.

11. The system according to claim 1, wherein the one or more processors are further configured to communicate the video feed with the aligned splice point to one or more encoders for distribution.

12. A method, comprising:
in a television playout system that is configured to handle playout of a channel:
receiving a video feed of the channel, wherein the video feed comprises programming data, a plurality of interstitial content items, and a playout schedule of the channel;
inserting metadata at a first insertion point-in-time in a playout of a first interstitial content item of the plurality of interstitial content items, based on the received playout schedule to indicate a splice point related to the first interstitial content item,
wherein the inserted metadata comprises a pre-roll value that indicates a time after the first insertion point-in-time, and wherein the time indicates a start of a playout of a second interstitial content item of the plurality of interstitial content items;
detecting an offset between the first insertion point-in-time of the metadata and an intended insertion point-in-time of the metadata related to the first interstitial content item based on the pre-roll value and a time-code (TC) jump associated with the second interstitial content item in the video feed,
wherein the TC jump corresponds to the start of the second interstitial content item; and
calibrating one or more control parameters associated with the insertion of the metadata, based on the detected offset to align the splice point related to the first interstitial content item in the video feed with the TC jump associated with the second interstitial content item in the video feed.

13. The method according to claim 12, wherein the received video feed corresponds to an uncompressed serial digital interface (SDI) video.

14. The method according to claim 12, wherein the video feed further includes ancillary data comprising close caption data, format definition data, and vertical interval time codes (VITC).

15. The method according to claim 12, wherein a time instant of the video feed that is related to the first insertion point corresponds to command time.

16. The method according to claim 12, wherein the splice point related to the first interstitial content item corresponds to a transition from the first interstitial content item to the second interstitial content item, and wherein the second interstitial content item follows the first interstitial content item in the received video feed.

17. The method according to claim 12, wherein the one or more control parameters correspond to at least one of the first insertion point of the metadata, the pre-roll value, or the playout schedule.

18. The method according to claim 12, wherein the plurality of interstitial content items correspond to at least one of an advertisement or a promotional media.

19. The method according to claim 12, wherein the detected offset further corresponds to a frame gap between the splice point related to the first interstitial content item and the TC jump associated with the second interstitial content item.

20. The method according to claim 12, wherein the TC jump associated with the second interstitial content item further corresponds to a jump in vertical interval time code (VITC) associated with the first interstitial content item and the second interstitial content item.

21. The method according to claim 12, wherein the inserted metadata corresponds to a Society of Cable Telecommunications Engineers (SCTE)-104-based digital ad-marker.

22. The method according to claim 12, further comprising communicating the video feed with the aligned splice point to one or more encoders for distribution.

23. A non-transitory computer-readable medium having stored thereon, computer executable instructions, which when executed by a computer, cause the computer to execute operations for a television playout system, the operations comprising:
receiving a video feed of a channel, wherein the video feed comprises programming data, a plurality of interstitial content items, and a playout schedule of the channel;
inserting metadata at a first insertion point-in-time in a playout of related to a first interstitial content item of the plurality of interstitial content items, based on the received playout schedule to indicate a splice point related to the first interstitial content item,
wherein the inserted metadata comprises a pre-roll value that indicates a time after the first insertion point-in-time, and wherein the time indicates a start of a playout of a second interstitial content item of the plurality of interstitial content items;
detecting an offset between the first insertion point-in-time of the metadata and an intended insertion point-in-time of the metadata related to the first interstitial content item based on the pre-roll value and a time-code (TC) jump associated with a second interstitial content item in the video feed,
wherein the TC jump corresponds to the start of the second interstitial content item; and
calibrating one or more control parameters associated with the insertion of the metadata, based on the detected offset to align the splice point related to the first interstitial content item in the video feed with the TC jump associated with the second interstitial content item in the video feed.

24. The system according to claim 3, wherein the VITC represents the ancillary data embedded as pairs of black and white bars in the video feed.

25. The system according to claim 1, wherein the one or more processors are further configured to generate at least one of an alarm or a log report based on the detection of the offset in the inserted metadata.

26. The method according to claim 14, wherein the VITC represents the ancillary data embedded as pairs of black and white bars in the video feed.

27. The method according to claim 12, further comprising generating at least one of an alarm or a log report based on the detection of the offset in the inserted metadata.

* * * * *